United States Patent

[11] 3,627,706

| [72] | Inventor | Peter R. Chant |
| | | Delft, Netherlands |
| [21] | Appl. No. | 10,546 |
| [22] | Filed | Feb. 11, 1970 |
| [45] | Patented | Dec. 14, 1971 |
| [73] | Assignee | Shell Oil Company |
| | | New York, N.Y. |
| [32] | Priority | Mar. 20, 1969 |
| [33] | | Great Britain |
| [31] | | 14,623/69 |

[54] MINERAL-FILLED FOAM PRODUCTION
3 Claims, 1 Drawing Fig.

[52] U.S. Cl. .................................................. 260/2.5 BD,
23/252, 23/284, 23/285, 23/313, 252/359 A,
260/2.5 AK

[51] Int. Cl. ...................................................... C08g 22/44,
C08g 51/02

[50] Field of Search ........................................... 260/2.5
AK, 2.5 AX

[56] References Cited
UNITED STATES PATENTS

| 3,510,392 | 5/1970 | D'Eustachio | 260/2.5 |
| 3,396,126 | 8/1968 | Gurley | 260/2.5 |
| 3,243,388 | 3/1966 | Ulfstedt | 260/2.5 |

FOREIGN PATENTS

| 6,703,668 | 12/1967 | Netherlands | 260/2.5 |

OTHER REFERENCES

Einhorn, " Extended Foams," Journal of Cellular Plastics, Jan. 1965, pages 25 to 31. (Copy in Scientific Library).

*Primary Examiner*—Donald E. Czaja
*Assistant Examiner*—C. Warren Ivy
*Attorneys*—Joseph W. Brown and Norris E. Faringer ABSTRACT: A method for preparing a mineral-filled polyurethane foam is disclosed, wherein a foamable polyurethane liquid is injected into a high-velocity gas stream directed towards a stream of granular-filled material to mix thoroughly and uniformly with the particles of filler.

PATENTED DEC 14 1971
3,627,706
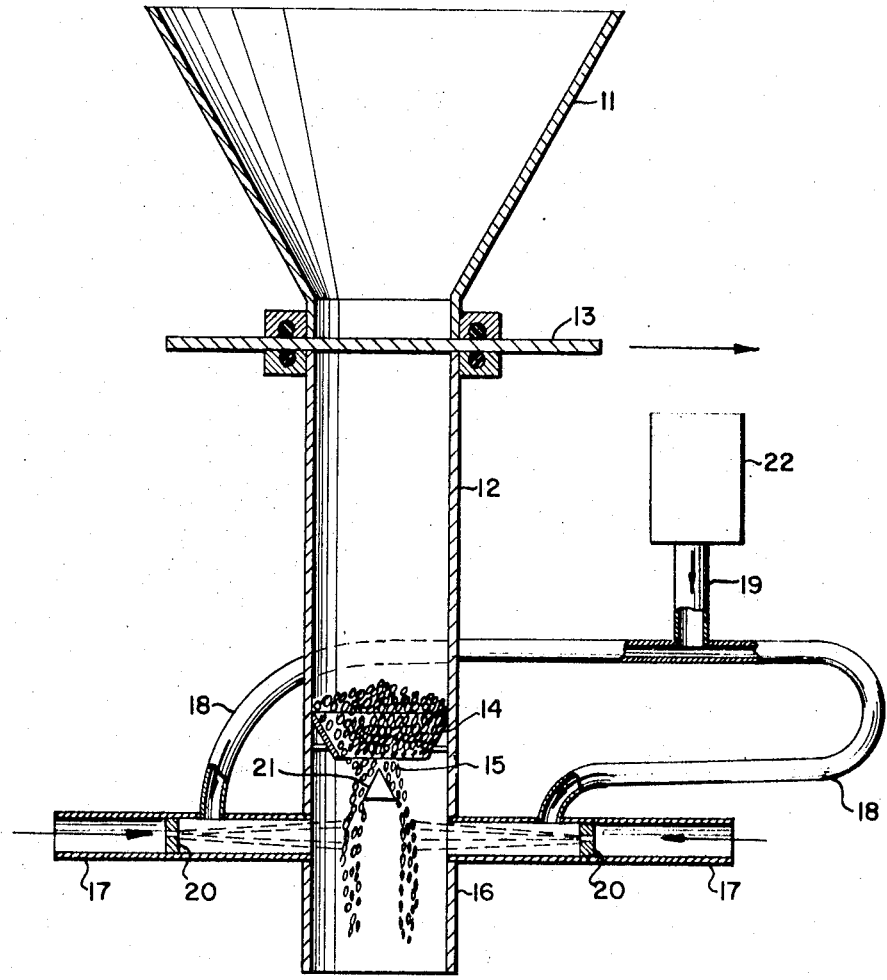
INVENTOR:
PETER R. CHANT
BY: Norris E. Faringer
HIS ATTORNEY

MINERAL-FILLED FOAM PRODUCTION

The invention relates to a method and apparatus for preparing a polyurethane foam containing granular filler. Various kinds of filler material have been proposed for inclusion in a polyurethane foam, for diverse reasons including improvement of desirable properties such as, for example, the strength or fire resistance of the material, and for reducing of costs of the final product. The term granular filler as used herein defines a granular material, normally mineral, having a particle size of at least 3 millimeters (mm.). Typically the filler comprises particles of various sizes in the range from about 2 to about 15 mm., preferably from 3 to 10 mm. The filler can be a compact material, but is commonly a sintered, porous or expanded material made of clay, vermiculite or glass.

It is known that polyurethane foam containing granular filler can be produced by first making a stapled bed of filler particles in a mold, the filler occupying approximately 40–50 percent of the space in the mold depending on the size or distribution of sizes of the filler. A liquid composition capable of forming a cured polyurethane foam is then poured over the bed, whereupon the mold is closed and the polyurethane liquid is allowed to foam and to cure. The term "polyurethane liquid" as used herein is defined as a "liquid composition capable of forming a cured polyurethane foam." The liquid must be in a flowable and foamable condition, but the foaming reaction may have commenced. After the foam has cured and hardened sufficiently to become dimensionally stable, the filled foam product is removed from the mold. This method has given poor results, mainly because of very incomplete filling of the interstices between the filler particles with polyurethane foam, which in turn is caused by the entrapment of air, the long and multidirectional flow path for the polyurethane liquid along the filler particles, and the high flow resistance exercised by the generally coarse wall of the filler material on the liquid. The method is also unsatisfactory in that it is a two-stage method which is unsuitable for high production rates.

It is possible to prepare the mixture in a one-stage process by spraying the liquid polyurethane composition onto a free-falling stream of the filler particles, whereupon the filler wetted by the polyurethane liquid is poured into a mold. If in this process a relatively slow-reacting polyurethane composition is used to allow ample time for filling and closing of the mold, the loss of reaction heat to the filler particles during the long reaction period results in a considerable loss in expansion capacity of the polyurethane composition, and consequently in high foam densities and incomplete filling of the interstices between the particles. To avoid this difficulty it is possible to use a fast-reacting composition, and the mold should then be filled more rapidly. However, since the volumetric rate of unfoamed or initially foaming polyurethane liquid to be sprayed on the filler is much less than the volumetric rate of the filler, it is very difficult to insure sufficient and uniform wetting of the falling particles of filler in the short period available for this wetting.

It is therefore an object of the invention to provide a method for preparing a polyurethane foam containing granular filler in which an improved contact is established between the filler and the polyurethane liquid.

Accordingly, the invention provides a method for preparing a polyurethane foam containing granular filler, comprising introducing a liquid composition capable of forming a cured polyurethane foam into a gas stream which is directed towards a stream of granular filler thereby forming a mixture of liquid and filler, and allowing the liquid in the mixture to foam and to cure. Advantageously the resulting cured product has a substantially homogeneous dispersion of the filler in the polyurethane foam. It is a further advantage that air inclosures within the foam are essentially eliminated.

The invention also provides an apparatus for preparing a polyurethane foam containing granular filler in accordance with this method, comprising a tubular body, a reservoir for granular filler mounted to discharge the filler from an outlet through the tubular body, a gas supply conduit for communication at one end with a source of compressed gas and issuing at its other end in the space within the tubular body at a point below the outlet of the reservoir, and a liquid supply conduit for communication at one end with a source of a liquid composition capable of forming a cured polyurethane foam and issuing at its other end in the gas supply conduit.

Preferably, the filler stream on being contacted by the polyurethane liquid is a free-falling stream, i.e., the stream is not in contact with any wall.

The gas stream, which is normally produced by the expansion of compressed air, serves both as a carrier and an accelerator for the polyurethane the polyurethane introduced therein. If the polyurethane liquid is injected as a solid stream of liquid, the air stream will transform the liquid in a fine spray which is directed with great speed towards the filler stream, preferably in a direction perpendicular to this stream. The fine liquid droplets in the spray can thereby penetrate deeply into the stream of filler to contact all particles thereof. A uniform wetting of the filler particles is also promoted by the turbulence created in the zone of contact of the filler and liquid by the high-velocity air stream. The turbulence breaks up the filler stream and intensifies contact with the spray of polyurethane liquid. To assist in its uniform dispersion in the air stream the polyurethane liquid is preferably injected perpendicularly into this stream. An apertured flow restriction such as a Venturi throat or orifice plate may have been mounted in the air conduit shortly in front of the point where the polyurethane liquid is injected therein. The flow restriction raises the velocity of the air stream, and the resulting pressure reduction at this point (the static pressure can drop to subatmospheric) assists the outflow of the viscous polyurethane liquid into the air stream. This flow assistance can become of great importance if several air conduits are provided around the filler stream, with each air conduit receiving polyurethane liquid from a common source. The use of more than one air conduit allows the polyurethane liquid to be sprayed towards the filler stream at various angles.

The outlet of the air conduit or the aperture in the flow restriction therein can be circular or have any other suitable shape, for example, the outlet or the aperture can be formed as a straight slit to form a spray which is flat in the plane perpendicular to the filler stream.

The filler can be any of the types mentioned earlier in this specification, preference being given to expanded mineral materials, in particular clay, glass or vermiculite. The volume of filler in the final product can vary between 15 and 80 percent of the volume of the product, but is usually in the range from 40–60 percent.

The polyurethane liquid at the moment of contacting the filler or already when being introduced into the air stream is preferably in a condition that the foam reaction has already started, so that the liquid is in foaming condition.

The invention will be further explained with reference to the accompanying drawing, which is a diagrammatic representation of an apparatus for practicing the invention.

The drawing shows a reservoir for granular filler, comprising a hopper 11 and a vertically extending discharge pipe 12. A gate valve 13 is located in the upper end of the pipe 12 for controlling the flow of filler from the hopper through the pipe 12. In the lower end of the discharge pipe 12 a diffusor 14 is mounted. A conical element 21 is mounted at a small distance below and centrally to the diffusor 14. The diffusor 14 and conical element 21 define an annular outlet 15 for the filler. The diffusor is interchangeable to allow the choice of an outlet of a desired size and configuration. The filler reservoir is so mounted that the filler from outlet 15 will fall freely by gravity through a cylindrical, normally vertically disposed tubular body 16. Two air supply conduits or air nozzles 17 are mounted at a level a small distance below the outlet 15, at right angles to the tubular body 16 and at diametrically opposite positions thereof. More air nozzles 17 may be provided with equal angular spacing around the periphery of the tubular body 16, at the same level as the two nozzles 17 shown. A polyurethane liquid can be supplied to each air nozzle 17 through liquid supply conduits 18 issuing at right angles into the air nozzles 17. The polyurethane liquid is supplied to the conduits 18 from a common source of supply 19, which is connected to the outlet of a mixing chamber 22 for polyurethane liquid. An orifice plate 20 is mounted in each air nozzle 17 shortly in front of the outlet of the conduit 18.

In operation the reservoir is filled with a charge of granular filler and the gate valve 13 is opened to allow the filler to fall through the outlet 15 and thereby form a tubular stream of filler in the central zone of the tubular body 16. Compressed gas is supplied to the nozzle 17, while polyurethane liquid in homogeneously mixed condition is supplied through conduits 18 into the air nozzles 17. The operating conditions are so selected that the polyurethane liquid issuing from the conduits 18 is in an initial stage of foaming. The stream of air in each air nozzle 17 meets with the polyurethane liquid and thereby forms a fine spray which is directed at high speed towards the filler stream, at right angles thereto, whereby the filler is intimately wetted by the liquid. The wetted filler can be poured into a mold which is then closed to allow the polyurethane liquid to complete the foaming and to cure. The finished article, for example a building panel, can then be removed from the mold.

For the insulation of pipes a section of the pipe to be coated can be placed vertically concentrically within a wider and outwardly supported tube. The wetted filler is poured over a distributor cone placed above the pipe section, so that it will flow evenly from the peripheral edge of the cone into the annular space between the pipe and tube. The tube can be made of thin metal or paper, and may remain on the insulated pipe or be removed therefrom.

Normally the polyurethane liquid is introduced into the air nozzles 17 as a solid stream of liquid which is converted by the air stream into a fine spray. The orifice 20 in the air nozzles reduces the pressure at the outlets of conduits 18, thereby promoting the outflow of polyurethane liquid, and the expansion of the air past the orifice improves the dispersion of the liquid in the air. The high speed which the air obtains upon its expansion allows the polyurethane droplets in the spray to penetrate deeply into the filler stream and thereby to mix thoroughly and uniformly with all particles of the filler. The easy mixing is also facilitated by the fact that the filler stream on being wetted is in the form of a hollow tube.

EXAMPLE

An apparatus was used of a design corresponding with the one shown in the drawing.

The inner diameter of the tubular body 16, the air nozzle 17, the liquid supply conduits 18, and the annular outlet 15 was respectively 150, 20, 6 and 100 mm. The greatest outer diameter of the conical element 21 was 50 mm. The aperture in the orifice plate 20 had a diameter of 2 mm. and a length in the axial direction of the nozzle of also 2 mm.

The apparatus had been provided with eight air nozzles each with a liquid supply conduit in regular angular spacing around the tubular body 16.

The hopper 11 was filled with expanded clay balls having a diameter of 3 to 10 mm., and having a bulk density of around 420 grams per liter (g./l.). The air pressure in the air nozzle 17 in front of the orifice plate was 6 kg./cm.². The quantity of polyurethane liquid supplied through the conduits 18 together was 13 kg./min. and the filler output through outlet 15 was 60 kg./min. The polyurethane liquid was mainly composed of a polyol and a diisocyanate, with trichloromonofluoromethane as a blowing agent. The wetted filler was poured into a mold, and after the polyurethane liquid in the closed mold had been allowed to expand to its fullest possible extent and had cured to become rigid, the molded product was taken from the mold. The overall product density was 320 g./l.; the average density of the polyurethane foam proper was 120 g./l. The mechanical properties of the product were as follows:

| | |
|---|---|
| bending strength | 15.9 kg./cm.² |
| bending modulus | 578 kg./cm.² |
| required pressure for 10% compression | 14.2 kg./cm.² |
| required pressure for 25% compression | 20.2 kg./cm.² |

On inspection the product was found to have a homogeneous dispersion of the filler in the polyurethane foam, and to be free of air enclosures.

I claim as my invention:

1. A method for preparing a polyurethane foam containing granular filler, comprising introducing a liquid composition capable of forming a cured polyurethane foam into a high-velocity gas stream which is directed towards a stream of granular filler which is free falling in the shape of a hollow tube to create a turbulent zone of contact thereby forming a mixture of liquid and filler, and allowing the liquid in the mixture to foam and to cure.

2. A method according to claim 1, in which the gas stream is directed towards the filler stream substantially perpendicularly thereto.

3. A method according to claim 1, in which the gas stream reduces the static pressure at the point of introduction of the liquid composition therein to subatmospheric.

* * * * *